(12) United States Patent
Andree et al.

(10) Patent No.: US 11,802,557 B2
(45) Date of Patent: Oct. 31, 2023

(54) METHOD FOR OPERATING AN ELECTRIC MOTOR

(71) Applicant: GKN Sinter Metals Engineering GmbH, Radevormwald (DE)

(72) Inventors: Maurice Andree, Neukirchen-Vluyn (DE); Hong Giang To, Düsseldorf (DE); Nils Bornemann, Bonn (DE)

(73) Assignee: GKN Sinter Metals Engineering GmbH, Radevormwald (DE)

( * ) Notice: Subject to any disclaimer, the term of this patent is extended or adjusted under 35 U.S.C. 154(b) by 652 days.

(21) Appl. No.: 16/978,580

(22) PCT Filed: Mar. 6, 2019

(86) PCT No.: PCT/EP2019/055561
§ 371 (c)(1),
(2) Date: Sep. 4, 2020

(87) PCT Pub. No.: WO2019/170738
PCT Pub. Date: Sep. 12, 2019

(65) Prior Publication Data
US 2021/0017980 A1    Jan. 21, 2021

(30) Foreign Application Priority Data
Mar. 6, 2018   (DE) .................. 10 2018 105 129.8

(51) Int. Cl.
*F04B 53/08* (2006.01)
*F04B 17/03* (2006.01)
(Continued)

(52) U.S. Cl.
CPC .............. *F04B 53/08* (2013.01); *F04B 17/03* (2013.01); *H02K 1/2795* (2022.01); *H02K 21/24* (2013.01); *H05B 6/10* (2013.01)

(58) Field of Classification Search
CPC ...... H02K 1/2795; H02K 1/146; H02K 21/24; H05B 6/10; H02P 2101/25; H02P 29/62;
(Continued)

(56) References Cited

U.S. PATENT DOCUMENTS 11,218,036 B2 *   1/2022  Isogai ....................... H02K 3/48
2016/0072362 A1*  3/2016  Kube ....................... H02K 7/116
                                                          310/67 R

FOREIGN PATENT DOCUMENTS

DE    102016103051 A1   8/2017
EP       2306105 A1    4/2011
(Continued)

OTHER PUBLICATIONS

PCT International Search Report and Written Opinion, PCT/EP2019/055561, dated May 15, 2019, 19 pages.
(Continued)

*Primary Examiner* — Emily P Pham
(74) *Attorney, Agent, or Firm* — Quarles & Brady LLP

(57) ABSTRACT

A method for operating an electric motor, the electric motor comprising at least one first stator with at least three coils and a rotor with at least two magnets, the first stator and the rotor being adjacently arranged in an axial direction, and the coils being adjacently arranged in a peripheral direction. The electric motor is operated at least in the following two states: a) in a first state, the coils are operated by respectively different phases of a three-phase current, and the rotor is rotated about an axis of rotation; and b) in a second state, the coils are operated by an equal-phase alternating current.

10 Claims, 4 Drawing Sheets

Figure 1:
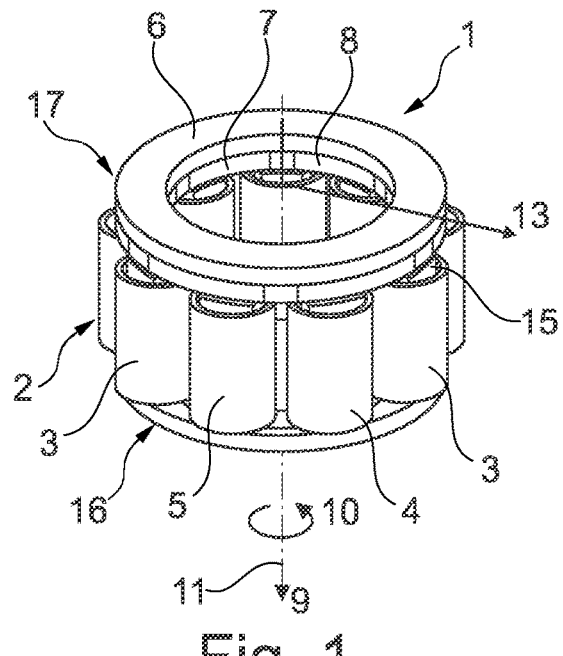

(51) Int. Cl.
*H02K 21/24* (2006.01)
*H02K 1/2795* (2022.01)
*H05B 6/10* (2006.01)

(58) Field of Classification Search
CPC ............ F01N 2610/02; F01N 2610/10; F01N 2610/1433; F01N 2610/144; F01N 3/2066; F04D 3/00; F04D 13/0666; F04D 29/588; F04B 53/08; F04B 17/03
See application file for complete search history.

(56) References Cited

FOREIGN PATENT DOCUMENTS

| | | |
|---|---|---|
| JP | H11127559 A | 5/1999 |
| JP | 2000231982 A | 8/2000 |
| JP | 2005012891 A | 1/2005 |
| JP | 2014150599 A | 8/2014 |
| WO | 2015049713 A1 | 4/2015 |
| WO | 2016066714 A2 | 5/2016 |
| WO | 2016102257 A1 | 6/2016 |

OTHER PUBLICATIONS

Japan Patent Office, Notice of Reasons for Refusal and translation thereof from Japanese Application No. 2020-546324 dated Jun. 2, 2022, 8 pages.

\* cited by examiner

METHOD FOR OPERATING AN ELECTRIC MOTOR

This application represents the U.S. national stage entry of International Application No. PCT/EP2019/055561 filed Mar. 6, 2019, which claims priority to German Patent Application No. 10 2018 105 129.8 filed Mar. 6, 2018, the disclosure of which is incorporated herein by reference in its entirety and for all purposes.

Applications are known in which it is possible to use not only a drive power of an electric motor but also a heating power of the electric motor. For example, when a urea-water solution (e.g. Adblue) which is used for exhaust gas treatment is fed, it may be desired to heat the urea-water solution. The electric motor which is used to drive a pump also generates heat which can be used e.g. to thaw the urea-water solution.

Proceeding from this, it is an object of the present invention to at least alleviate, or even solve, the problems described in relation to the prior art. In particular, a method for operating an electric motor is to be proposed by means of which the electric machine is used in a targeted way to generate heating power.

In order to achieve these objects, a method according to the features of claim 1 is proposed. Advantageous developments are the subject matter of the dependent claims. The features which are specified individually in the claims can be combined with one another in a technologically appropriate way and can be supplemented with explanatory content from the description and details from the figures, in which further embodiment variants of the invention are presented.

A method for operating an electric motor is proposed, wherein the electric motor has at least one first stator with at least three coils and a rotor with at least two magnets. The first stator and the rotor are arranged one next to the other along an axial direction. The coils are arranged one next to the other along a circumferential direction (over a common diameter). The electric motor is operated at least in the following two states:
  in a first state, the coils are operated with respective different phases of a three-phase current and the rotor is made to rotate about a rotational axis (rotational speed higher than zero revolutions per minute);
  in a second state, the coils are operated with an alternating current with the same phase.

In particular, the power consumed by the electric motor in the second state is used (temporarily or in predefinable time periods) exclusively to heat a body. The body is arranged in particular at a distance from the at least one stator and the rotor.

In addition, the power consumed can be used (temporarily or in predefinable time periods) additionally or else exclusively to drive the rotor so that the rotor rotates with a rotational speed of more than "0" revolutions per minute about a rotational axis.

In the second state, a body is to be heated in particular by means of induction. The body can form e.g. a housing (or a part thereof) of the electric motor. The body can form a line for a fluid, so that a fluid can be heated via the body.

When heating through induction occurs, the heat is produced directly in the body itself, that is to say does not have to be transmitted through thermal conduction. The heating power can be controlled satisfactorily. For the purpose of inductive heating, the stator or the coils of the stator generates/generate an alternating magnetic field which generates eddy currents in the material of the body. Inductive heating can also occur through non-conducting materials (e.g. a wall of a tank). The surroundings are heated only indirectly (in particular owing to thermal radiation or conduction originating from the inductively heated body).

The electric motor comprises at least one stator and a rotor. In particular, the electric motor is an axial flux motor which comprises at least one stator and a rotor which are arranged coaxially with respect to one another and one next to the other along an axial direction.

The stator of the electric motor has, in particular, a soft-magnetic material, for example what is referred to as a "Soft Magnetic Composite" (SMC), or a combination of electrical sheets and SMC. The coils of the stator comprise cores which preferably are manufactured by pressing from a soft-magnetic material and baking. The SMC material is not sintered here. Instead, the temperature is controlled to below a melting temperature which is, however, sufficient for the cores to maintain their geometry permanently.

The rotor has in particular permanent magnets and/or soft-magnetic elements for example in recesses. Permanent magnets can preferably be used to form a permanently-excited synchronous or brushless DC motor, abbreviated to BLDC, while for example soft-magnetic elements can be used to produce a reluctance motor as the electric motor.

The design of a stator, in particular using SMC, as well as further details also relating to a rotor can be found, for example, in WO 2016/066714 A1, which is referred to within the scope of the disclosure of the present invention and to which reference is made completely.

The electric motor has in particular an electrical power consumption (that is to say a maximum drive power) of less than 1000 watts (rated power), preferably of less than 500 watts, particularly preferably of less than 100 watts.

In particular, the power consumed by the electric motor is used here, on the one hand, to drive the rotor (first state) so that the rotor rotates with a rotational speed of more than "0" revolutions per minute about a rotational axis. On the other hand, the power consumed by the electric motor is used to heat a body (second state).

In particular, the electric motor can be operated in both states, so that the rotor is driven by the operation of the electric motor in the first state and chronologically in parallel a body is heated by the operation of the electric motor in the second state.

Chronologically in parallel means here in particular that changing occurs between the first state and the second state (in particular continuously back and forth) in a time interval (e.g. a second), under certain circumstances for sub-intervals of the time interval of different lengths.

The power consumption for driving the rotor and the power consumption for heating a body can occur, in particular, chronologically in parallel (that is to say within a time interval, e.g. a second, alternately) or else exclusively in each case (that is to say power consumption within the time interval only for heating or only for driving).

In particular, the electric motor is used (essentially) to drive the rotor. In this context, when the electric motor is operated with a first drive power (the drive power can be considered to be the entire current power consumption of the electric motor, in particular a maximum drive power, that is to say e.g. the rated power of the electric motor), the body is heated with a first heating power which is at most 10%, in particular at most 5% and preferably at most 1% of the first drive power (in particular of the maximum drive power). In particular, at least 90% (or at least 95% or at least 99%) of the first drive power is used to drive the rotor.

The heating power which is transmitted to the body is in particular the electrical power in watts which is converted by the electrical resistance in the body into heat.

In particular, a carrier for magnets is referred to as the rotor. In particular, the rotor is arranged along an axial direction at a distance from the at least one first stator so that a delimitation of the rotor from other components is clear.

The electric motor can be driven with an electric second drive power, wherein heating of the body by an electric second heating power takes place; wherein the second heating power is at least 20%, in particular at least 50%, preferably at least 80% of the second drive power. In particular, at most 80% (or at most 50% or at most 20%) of the second drive power is used to drive the rotor.

It is therefore proposed here to convert a variable or, if appropriate, also fixed portion of the electrical power (first or second drive power) which is taken up by the electric motor into heat. This heat is preferably to be generated in a body by means of induction.

In particular, when the first and second drive power are the same in absolute terms, a first and second heating power which differ from one another (significantly) in absolute terms can be set.

In particular, the electric motor has a second stator with at least three coils. The rotor can be arranged along the axial direction between the first stator and the second stator. The statements relating to the arrangement of the first stator and rotor apply, in particular, equally to the second stator.

The rotor is in particular connected to a drive shaft which extends coaxially with respect to the rotational axis. In particular, the drive shaft extends through at least one stator.

An electrically conductive body, which is heated by induction at least during operation of the electric motor in the second state, is preferably arranged in a radial direction at least within or outside at least one stator.

Alternatively or additionally the body can be the rotor. The rotor has for this purpose a carrier material, referred to as the body, in addition to the magnets.

In particular, a specific electrical first resistance [ohm*millimeter$^2$/meter] of the body is lower than a specific electrical second resistance of a core of a coil.

In particular, the SMC material used for the core has a high specific electrical resistance. In particular, the body (which is manufactured e.g. from a steel) has a lower specific electrical resistance (than the material used for the core).

In particular, the body specifically serves to convert the supplied heating power into heat. The body is preferably constructed with an iron content or in a ferritic fashion so that effective heating is possible. In particular, the body has a significantly higher ferritic content than a core of at least one coil.

In particular, a specific electrical first resistance is lower by a factor of at least two, preferably of at least five, particularly preferably of at least 10, than a specific electrical second resistance.

Relevant aspects can be covered by the body, in particular for mounting of the motor assembly. For example, since the stator is inserted into the body, radial fixing/orientation is possible simultaneously (if appropriate by means of a slight press fit or clearance fit for orienting the body and stator, with subsequent casting).

The body can represent a part of a housing of the motor assembly and be used as a mounting body. Furthermore, it is possible to provide a suitable structure in the body so that a bearing means is pressed directly into the body.

By means of the heating power, the body can reach a minimum temperature of e.g. 50 degrees Celsius, in particular of 100 degrees Celsius, in particular if the ambient temperature has a lower temperature than the minimum temperature of the body. The heating power is preferably regulated in such a way that a specific maximum temperature, preferably 100 degrees Celsius, is not exceeded. In particular, the body is heated quickly to the maximum temperature and sufficient heating power is fed in, so that the body maintains this maximum temperature despite further conduction of heat to e.g. a fluid and/or other components.

In particular, the temperature of the body is measured directly or indirectly and/or calculated or estimated on the basis of the fed-in heating power or of a temperature model.

In particular, each coil of the at least one (each) stator has a core which extends starting from a first end to a second end of the at least one stator (in particular parallel to the axial direction), wherein the rotor is arranged adjacent to the at least one second end.

The body extends in particular along a circumferential direction completely (in a radial direction within or outside the cores or the coils) and along an axial direction (and the rotational axis running parallel thereto) up to the at least one first end of the core.

The body is preferably in contact, at the at least one first end, with the cores of the coils.

In particular, the magnetic flux is directed via the body in such a way that the highest possible portion of the electric (drive) power of the electric motor can be converted into heat by the body.

In particular, the body extends starting from an end side, facing away from the first stator, of the rotor along the axial direction and in a radial direction within or outside the coils up to the first end.

In particular, the body extends at the at least one first end along the radial direction to at least over the extent of the cores.

In particular, the body extends at the second end along the radial direction and along the end side, facing away from the first stator, of the rotor to at least over the extent of the cores (in alignment above the rotor).

If two stators are provided, the body extends in particular starting from each first end of the stators up to the second ends or beyond the second ends, so that the magnetic flux of the electric motor is directed either via the cores of the two stators or via the cores of one stator in each case.

The body is in particular embodied in multiple parts, wherein the individual parts of the body are in contact with one another or are arranged so as to be separated from one another via an (air) gap which is as small as possible. The gap is in particular at most one millimeter, in particular at most 0.5 millimeters, particularly preferably at most 200 micrometers. In particular, such a gap is present between the rotor and the body (the gap extends in particular in a plane perpendicular to the rotational axis).

In particular, in the second state a first portion of electrical (drive) power, which is applied to the electric motor, in the at least one stator (or in both stators together) and a second portion in the body are converted into heat, wherein the first portion is at most 80%, in particular at least 40%, preferably at most 20%, particularly preferably at most 5%, of the second portion.

In particular, a pump for feeding a fluid can be driven by means of the electric motor, wherein in the first state the pump (for feeding the fluid) is operated and in the second state at least the fluid which can be fed by the pump is heated.

In particular, the electrical (drive) power which is used in the second state is at least 1%, in particular at least 10%, preferably at least 25%, particularly preferably at least 50%, of a rated power of the electric motor.

In the second state, the coils are operated with an alternating current with the same phase. There is then in particular no multi-phase current present so that driving of the rotor specifically does not occur. An alternating magnetic field which can generate heat in the body by induction is generated by means of the alternating current.

The electric motor can, however, also be operated in other states in which the modes of operation of the first state and of the second state are implemented in a chronologically overlapping fashion (that is to say at least partially parallel chronologically) or chronologically offset with respect to one another.

Alternatively or additionally, the following method can be used here:

The electric motor has at least one first stator with a multiplicity of coils and a rotor with at least two magnets. The first stator and the rotor are arranged one next to the other along an axial direction. The coils are arranged one next to the other along a circumferential direction (on a common diameter). In this context, a rotational speed of the rotor can be settable in a variable fashion by means of a first frequency signal (of each phase) of the electric motor. In particular, the rotational speed of the rotor changes in proportion with the first frequency signal of the electric motor. In particular, the electric motor transmits, via a first frequency signal of the electric motor, electric (drive) power (in watts) for driving the rotor and, via a second frequency signal, heating power for heating the body, wherein the first frequency signal and the second frequency signal differ (in terms of the frequency) by at least a factor of 2 (in particular by a factor of 3 or even 5). In particular, the frequency of the second frequency signal is therefore at least twice (or three times or five times) as high as the frequency of the first frequency signal.

In particular, the second frequency signal has such a high frequency that it is not possible to drive the rotor via the second frequency signal, for example owing to mass inertia or material characteristic values. In particular, the electrical power which is transmitted by the second frequency signal is converted virtually exclusively into heat.

In particular, the first frequency signal and the second frequency signal are transmitted simultaneously with respect to one another. The first frequency signal and the second frequency signal can be transmitted superimposed on one another (that is to say at the same time). Therefore it is in particular possible that the drive power which is taken up by the electric motor can be converted, after having been determined (to virtually any desired extent) simultaneously and/or proportionally, both into electrical power for driving the rotor and into heating power for heating the body.

It is possible that the first frequency signal and the second frequency signal are transmitted (exclusively) chronologically offset with respect to one another.

The electric motor is preferably driven in the second state with a second drive power (that is to say the power consumption of the electric motor) which is transmitted (essentially) exclusively for heating the rotor as the second heating power. In this context, in particular no electrical power is used to drive the rotor. In particular, the rotational speed of the rotor is therefore "0" revolutions per minute despite the power consumption of the electric motor (second drive power).

In particular, in the second state the electric motor is not accelerated. That is to say, in particular, that a rotational speed higher than zero revolutions per minute of the rotor can be present, but that the rotor is not accelerated by the drive power which is used exclusively for conversion into heat.

Furthermore, a motor assembly is proposed, at least comprising an electric motor which has at least one first stator with at least three coils and a rotor with at least two magnets. The first stator and the rotor are arranged one next to the other along an axial direction (and coaxially with respect to one another), wherein the coils are arranged one next to the other along a circumferential direction (on a common diameter). An electrically conductive body is arranged in a radial direction at least within or outside the first stator. Alternatively or additionally, the rotor forms the body. A specific electrical first resistance of the body is lower is than a specific electrical second resistance of a core of a coil. The electric motor can be operated with the method which has already been described.

Furthermore, a pump assembly is proposed, at least comprising the motor assembly already described and additionally comprising a pump which can be driven by the electric motor in order to feed a fluid. The body is arranged in such a way that the fluid which can be fed by the pump can be heated via the body.

In particular, the motor assembly and/or the pump assembly have/has a control unit which is suitable and configured for carrying out the method described above, so that the control unit can regulate electrical power for driving the rotor and heating power for heating the body at least partially independently of one another.

The statements relating to the method apply equally to the motor assembly and the pump assembly, and vice-versa.

In particular, the at least one stator is arranged so as to be separated from the rotor in a fluid-tight manner (if appropriate also in a gas-tight manner).

Therefore, a method is proposed in which an electric motor is used, on the one hand, to drive a rotor (that is to say to carry out a rotational movement) and, on the other hand, to heat a body in a targeted fashion by means of induction. In this context, the body can also be exclusively heated and the rotor not driven at all. This is in particular advantageous for fluids which can freeze, such as e.g. urea-water solutions which have a freezing point at approximately −11 degrees Celsius. By means of the body it is therefore possible, on the one hand, to thaw a fluid which is stored in a tank and then feed it to an increasing degree.

The electric motor can therefore make available a particularly high heating power level, wherein, in particular, the heating power can be of the order of magnitude of the rated power.

The electric motor is in particular what is referred to as an axial flux motor, wherein the rotor and the at least one stator are arranged one next to the other along an axial direction. The stator has a multiplicity of cores (n*3, where n=1, 2, 3, . . . ) which are arranged one next to the other along a circumferential direction on a common diameter and are each surrounded by a coil. The rotor has a multiplicity of magnets which are arranged one next to the other on a carrier material along the circumferential direction on a common diameter (identical or different to the diameter of the cores). The number of magnets can differ from the number of coils.

By way of precaution, it is noted that the numerical expressions used here ("first", "second", "third", . . . ) serve primarily (only) to differentiate a plurality of similar subject matters, variables or processes, that is to say in particular do not necessarily specify a dependence and/or sequence of these subject matters, variables or processes with respect to one another. If a dependence and/or sequence is to be necessary, this is explicitly stated here or arises in an obvious way for a person skilled in the art on studying the specifically described embodiment.

Figure 2:
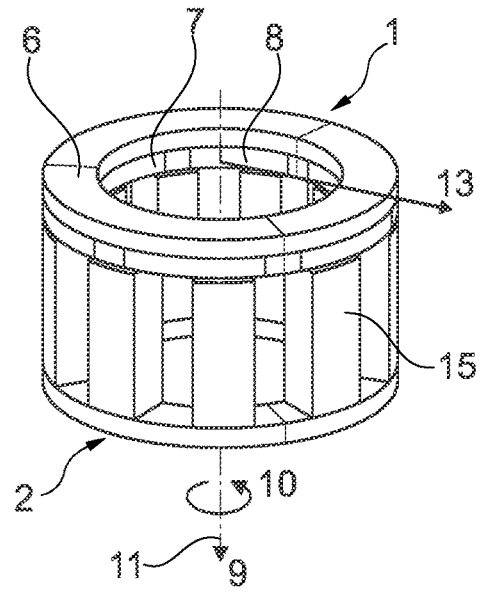
Figure 3:
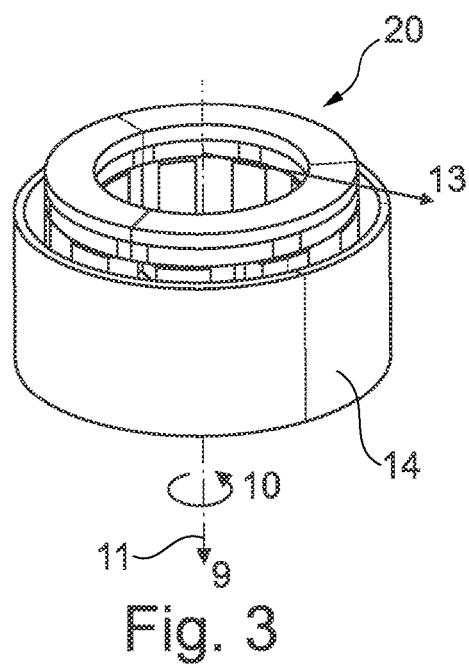
Figure 4:
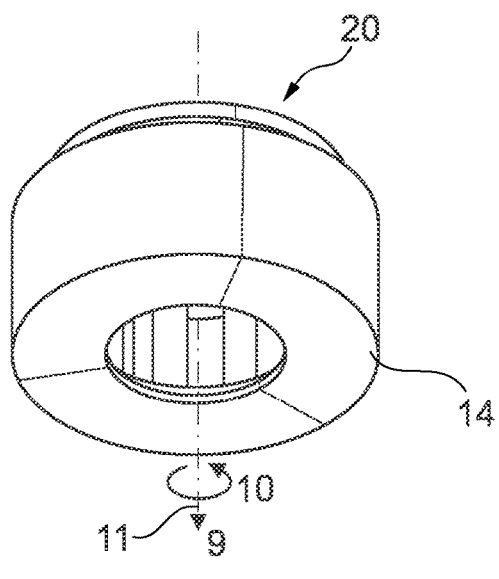
Figure 5:
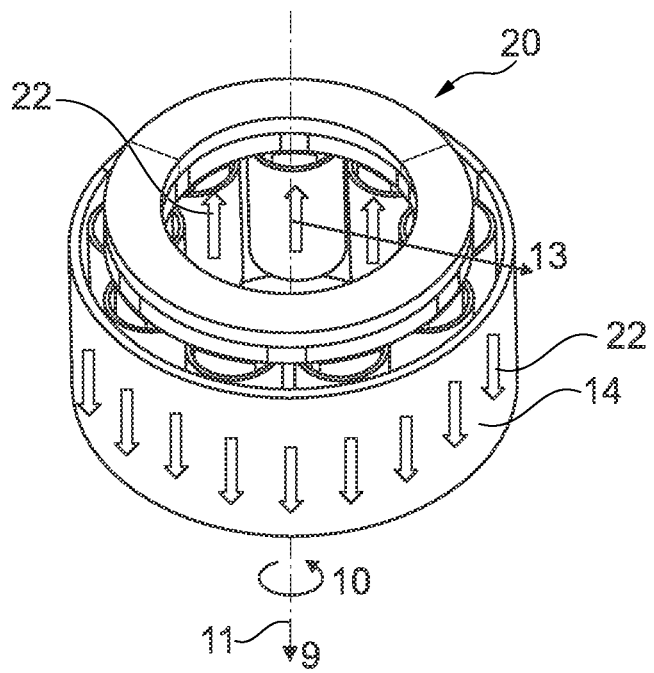
Figure 6:
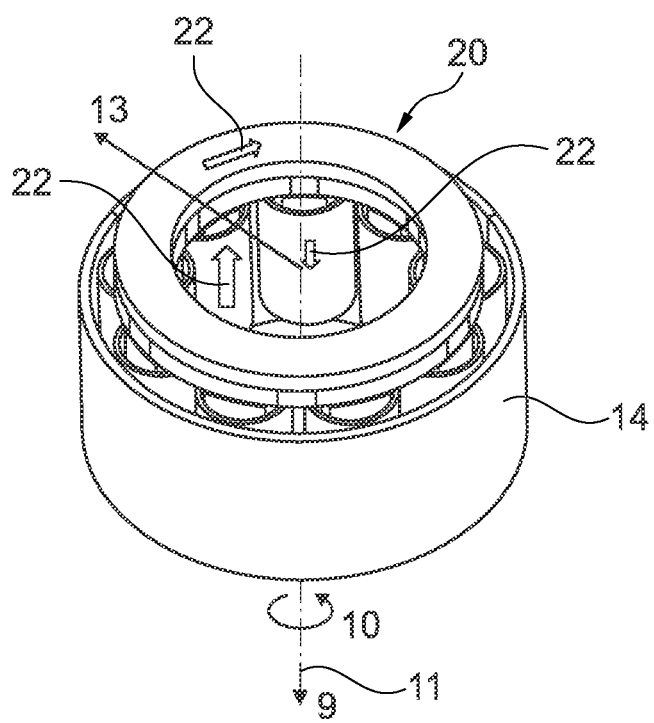
Figure 7:
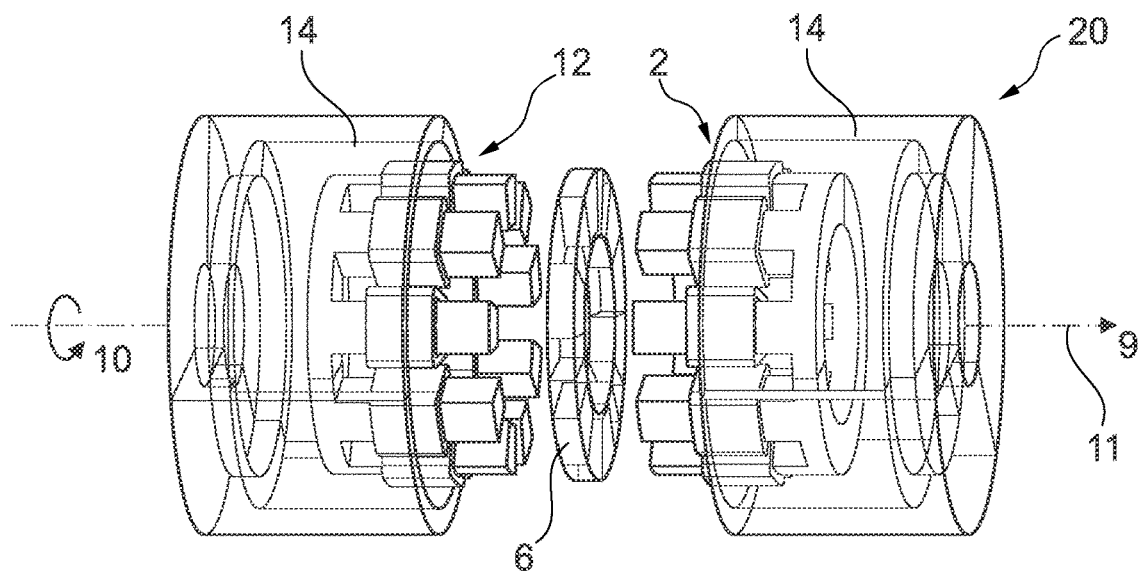
Figure 8:
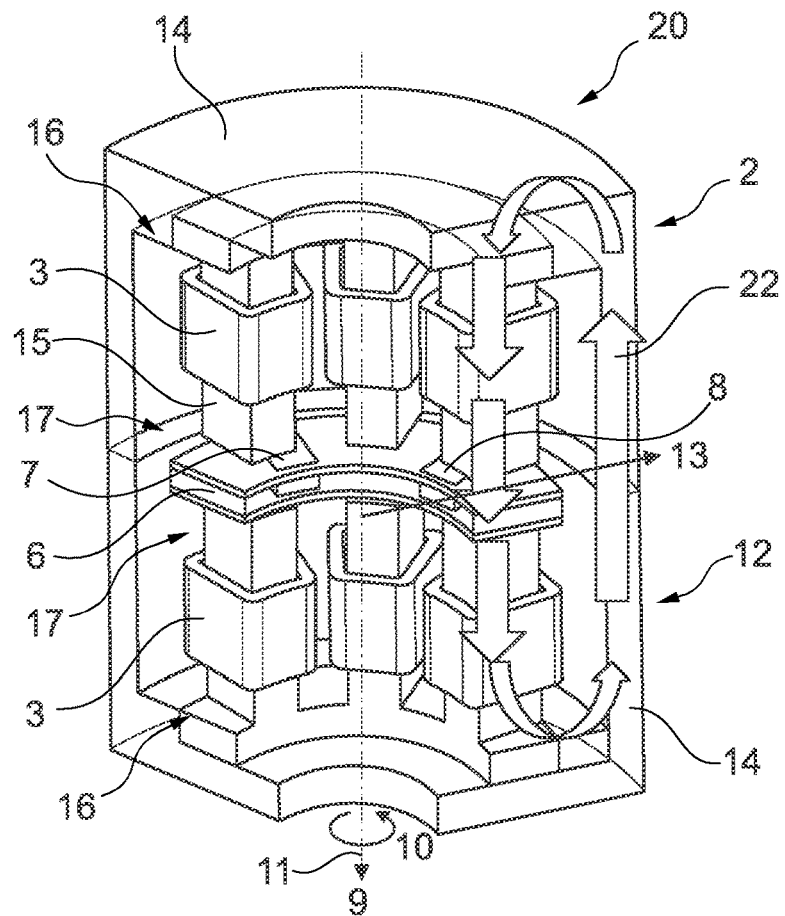
Figure 9:
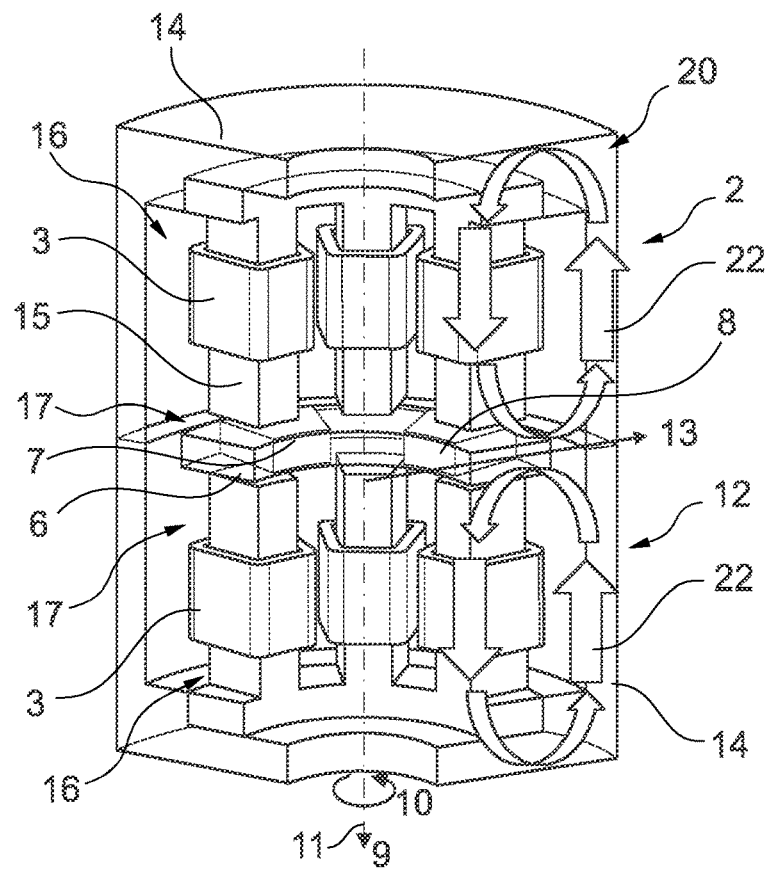
Figure 10:
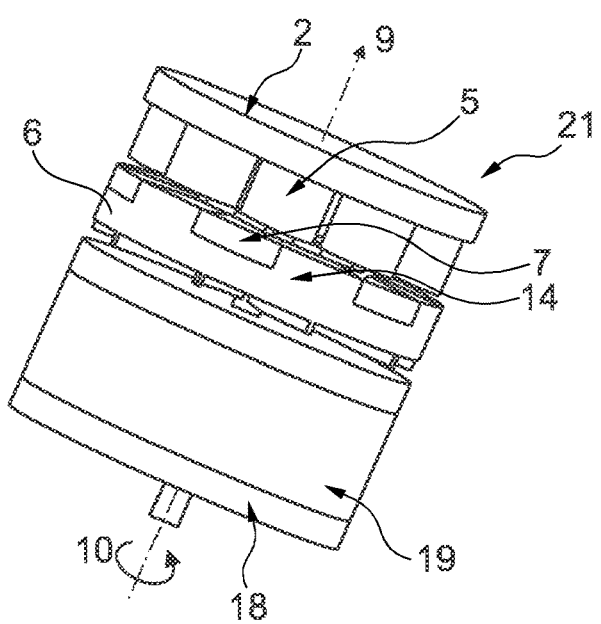

The invention and the technical field are explained in more detail below with reference to the figures. It is to be noted that the invention is not intended to be limited by the exemplary embodiments which are shown. In particular, it is, unless explicitly stated otherwise, also possible to extract partial aspects of the contents which are explained in the figures and combine them with other constituent parts and realizations from the present description and/or figures. Identical reference signs denote identical subject matters, so that if appropriate explanations from other figures can be additionally used. In the drawings, in each case schematically:

FIG. 1: shows an electric motor in a perspective view;

FIG. 2: shows a part of the electric motor according to FIG. 1 in a perspective view;

FIG. 3: shows the electric motor according to FIG. 1 in a motor assembly in a first perspective view;

FIG. 4: shows the motor assembly according to FIG. 3 in a second perspective view;

FIG. 5: shows the motor assembly according to FIGS. 3 and 4 in a perspective view in a second state;

FIG. 6: shows the motor assembly according to FIGS. 3 and 4 in a perspective view in a first state;

FIG. 7: shows a further embodiment variant of a motor assembly in a perspective view in an exploded illustration;

FIG. 8: shows a motor assembly according to FIG. 7 in a perspective view in section in a second state;

FIG. 9: shows the motor assembly according to FIG. 7 in a perspective view in section in an (other) second state; and FIG. 10: shows a pump assembly in a perspective view.

FIG. 1 shows an electric motor 1 in a perspective view. The electric motor 1 comprises at least one first stator 2 and a rotor 6. The electric motor 1 is an axial flux motor, wherein the stator 2 and rotor 6 are arranged coaxially with respect to one another and one next to the other along an axial direction 9. The rotor 6 has alternately first magnets 7 (first pole) and second magnets 8 (second pole) along the circumferential direction 10. Here, six magnets 7, 8 (in each case three) are provided. The stator 2 has cores 15 which extend along the axial direction 9 through coils 3, 4, 5. Each coil 3, 4, 5 is connected to a phase of a three-phase current generator. The coils 3, 4, 5 are arranged along the circumferential direction 10 in the following sequence: first coil 3, second coil 4, third coil 5, first coil 3, etc. Here, nine coils 3, 4, 5 (in each case three) are provided.

Each core 15 extends starting from a first end 16 of the stator 2 up to a second end 17 of the stator 2, wherein the rotor 6 is arranged adjacent to the second end 17.

FIG. 2 shows a part of the electric motor 1 according to FIG. 1 in a perspective view. Reference is made to the statements relating to FIG. 1.

Here, the coils 3, 4, 5 are not illustrated.

FIG. 3 shows the electric motor 1 according to FIG. 1 in a motor assembly 20 in a first perspective view. FIG. 4 shows the motor assembly 20 according to FIG. 3 in a second perspective view. Reference is made to the statements relating to FIG. 1.

The motor assembly 20 comprises the electric motor 1 and an electrically conductive body 14 which is arranged in a radial direction 13 outside the first stator 2. A specific electrical first resistance of the body 14 is higher than a specific electrical second resistance of a core 15 of a coil 3, 4, 5. The electric motor 1 can be operated with the described method.

The body 14 extends along a circumferential direction 10 completely (in a radial direction 13 outside the cores 15 or the coils 3, 4, 5) and along an axial direction 9 (and the rotational axis 11 running parallel thereto) starting from the second end 17 of the stator 2 up to the first end 16 of the stator 2. The body 14 is in contact, at the first end 16 of the first stator 2, with the cores 15 of the coils 3, 4, 5. The body 14 extends at the first end 16 along the radial direction 13 to over the extent of the cores 15 (FIG. 4). The body 14 forms here a pot with a cylindrical section (starting from the second end 17 up to the first end 16) and a base (at the first end 16).

FIG. 5 shows the motor assembly 20 according to FIGS. 3 and 4 in a perspective view in a second state. Reference is made to the statements relating to FIGS. 3 and 4.

In the second state, the coils 3, 4, 5 are operated with an alternating current with the same phase. There is then no multi-phase current (that is to say no phase offset between the individual electric currents) present so that driving of the rotor 6 specifically does not occur. The alternating current causes an alternating magnetic field to be generated which can generate heat in the body 14 by means of the magnetic flux 22 which is generated and transmitting via induction.

The magnetic flux 22 is directed via the body 14 in such a way that the highest possible portion of the electrical (drive) power of the electric motor 1 can be converted into heat by the body 14. The body 14 directs the magnetic flux 22 starting from the second end 17 along the axial direction 9 up to the first end 16 and back again into the cores 15.

The illustrated arrows show the magnetic flux 22 which is generated with a common phase and is always of the same strength at a point in time.

FIG. 6 shows the motor assembly 20 according to FIGS. 3 and 4 in a perspective view in a first state. Reference is made to the statements relating to FIGS. 3 and 4.

In the first state, the coils 3, 4, 5 are operated with respective different phases of a three-phase current generator and the rotor 6 is made to rotate about the rotational axis 11 (rotational speed higher than zero revolutions per minute). The illustrated arrows show the magnetic flux 22 which differs in strength depending on the phase at a point in time. The magnetic flux 22 is directed here in particular via the rotor 6 and back to the cores 15 (of the coil 3, 4, 5 which is respectively operated with the same phase). A magnetic flux 22 in the body 15 is generated in particular with a negligible magnitude.

FIG. 7 shows a further embodiment variant of a motor assembly 20 in a perspective view in an exploded illustration.

The electric motor 1 here has a first stator 2 and a second stator 12, with nine coils 3, 4, 5 per stator 2, 12 (that is to say three first coils 3, three second coils 4 and three third coils 5 per stator 2, 12). The rotor 6 is arranged along the axial direction 9 between the first stator 2 and the second stator 12.

The motor assembly 20 has two bodies 14. Each body 14 extends starting from the second end 17 of a stator 2, 12 along the axial direction 9 and in a radial direction 13 outside the coils 3, 4, 5 up to the first end 16 of the respective stator 2, 12. Each body 14 extends at the first end 16 along the radial direction 13 to over the extent of the cores 15. Each body 14 forms a pot with a cylindrical section (starting from the second end 17 up to the first end 16) and a base (at the first end 16). The bodies 14 are in contact with one another via the end faces of the bodies 14 at the second ends 17 (see FIGS. 8 and 9).

FIG. 8 shows the motor assembly 1 according to FIG. 7 in a perspective view in section in a second state. Reference is made to the statements relating to FIG. 7.

In the second state, the coils 3, 4, 5 are operated with an alternating current with the same phase. There is then no multi-phase current (that is to say no phase offset between the individual electric currents) present so that driving of the rotor 6 specifically does not occur. The alternating current causes an alternating magnetic field to be generated which can generate heat in the (multi-part) body 14 by means of the magnetic flux 22 which is generated and transmitting via induction.

The magnetic flux 22 is directed via the body 14 in such a way that the highest possible portion of the electrical (drive) power of the electric motor 1 can be converted into heat by the body 14. The body 14 directs the magnetic flux 22 starting e.g. from a first end 16 of the second stator 12 firstly along the radial direction 13 and then along the axial direction 9 up to the first end 16 of the first stator 2 and there via the cores 15 of the first stator 2 along the axial direction 9 via the rotor 6 to the cores 15 of the second stator 12 and back again to the first end 16 of the second stator 12.

FIG. 9 shows the motor assembly according to FIG. 7 in a perspective view in section in an (other) second state. Reference is made to the statements relating to FIG. 8.

In contrast to FIG. 8, the magnetic flux 22 is directed here via just one stator 2, 12 in each case. The (multi-part) body 14 directs the magnetic flux 22 starting e.g. from a first end 16 of the second stator 12 firstly along the radial direction 13 and then along the axial direction 9 up to the second end 17 of the second stator 12 and there via the cores 15 of the second stator 12 along the axial direction 9 back again to the first end 16 of the second stator 12. The same applies to the first stator 2. The magnetic flux 22 is therefore directed starting e.g. from the first end 16 of the first stator 2 along the axial direction 9 via the cores 15 of the first stator 2 up to the second end 17 of the first stator 2 and subsequently via the body 14 along the axial direction 9 back again to the first end 16 of the first stator 2.

FIG. 10 shows a pump assembly 21 in a perspective view. The pump assembly 21 comprises an electric motor 1 with a first stator 2 (with coils 3, 4, 5) and a rotor 6 (with magnets 7, 8) as well as additionally a pump 18 which can be driven by the electric motor 1 in order to feed a fluid 19. The body 14 is formed here by the carrier material of the rotor 6 which bears the magnets 7, 8. This assembly is particularly advantageous if the body 14 is heated by means of high-frequency excitation.

However, it is preferred that the body 14 is arranged as illustrated in FIGS. 3 to 9, wherein the fluid 19 is connected to the body via a connection which is as thermally conductive as possible.

LIST OF REFERENCE SIGNS

1 Motor
2 First stator
3 First coil
4 Second coil
5 Third coil
6 Rotor
7 First magnet
8 Second magnet
9 Axial direction
10 Circumferential direction
11 Rotational axis
12 Second stator
13 Radial direction
14 Body
15 Core
16 First end
17 Second end
18 Pump
19 Fluid
20 Motor assembly
21 Pump assembly
22 Magnetic flux

The invention claimed is:

1. A method for operating an electric motor, wherein the electric motor has at least one first stator with at least three coils and a rotor with at least two magnets; wherein the at least one first stator and the rotor are arranged one next to the other along an axial direction, wherein the at least three coils are arranged one next to the other along a circumferential direction, each coil of the at least three coils having a core which extends starting from a first end to a second end of the at least one first stator in which the rotor is arranged adjacent to the second end; wherein an electrically conductive body is arranged in a radial direction at least within or outside the at least one first stator, the electrically conductive body extending along a circumferential direction completely and along an axial direction up to the first end, the method comprising:
   operating the electric motor at least in two states:
       a) in a first state, the at least three coils are operated with respective different phases of a three-phase current and the rotor is made to rotate about a rotational axis;
       b) in a second state, the at least three coils are operated with an alternating current with the same phase during which the electrically conductive body is heated by induction.

2. The method of claim 1, wherein the electric motor is operated in both states, so that chronologically in parallel the rotor is driven by the operation of the electric motor in the first state and the electrically conductive body is heated by the operation of the electric motor in the second state.

3. The method of claim 1, wherein the electric motor has a second stator with at least three coils; wherein the rotor is arranged along the axial direction between the first stator and the second stator.

4. The method of claim 1, wherein a specific electrical first resistance of the electrically conductive body is lower than a specific electrical second resistance of the cores of the at least three coils.

5. The method of claim 1, wherein the electrically conductive body is in contact, at the first end, with the cores of the at least three coils.

6. The method of claim 1, wherein in the second state a first portion of electrical power, which is applied to the electric motor, in the at least one stator and a second portion in the electrically conductive body are converted into heat, wherein the first portion is at most 80% of the second portion.

7. The method of claim 1, wherein a pump for feeding a fluid is drivable by the electric motor, wherein in the first state the pump is operated and in the second state at least the fluid which can be fed by the pump is heated.

8. The method of claim 1, wherein the electrical power which is used in the second state is at least 1% of a rated power of the electric motor.

9. A motor assembly, at least comprising an electric motor which has at least one first stator with at least three coils and a rotor with at least two magnets; wherein the at least one first stator and the rotor are arranged one next to the other along an axial direction, wherein the coils are arranged one next to the other along a circumferential direction; wherein an electrically conductive body is arranged in a radial direction at least within or outside the at least one first stator; wherein a specific electrical first resistance of the electrically conductive body is lower than a specific electrical second resistance of a core of a coil of the at least three coils; wherein the electric motor is operable with the method of claim 1.

10. A pump assembly, at least comprising the motor assembly of claim 9 and further comprising a pump drivable by the electric motor in order to feed a fluid; wherein the electrically conductive body is arranged in order to heat, via the electrically conductive body, the fluid feedable by the pump.

\* \* \* \* \*